CALL DISTRIBUTING CIRCUIT

Filed June 12, 1963 2 Sheets-Sheet 1

INVENTORS J. O. HOWELL
D. A. MAC LEOD
BY T. R. McCorkendale
ATTORNEY

Sept. 27, 1966 J. O. HOWELL ETAL 3,275,754

CALL DISTRIBUTING CIRCUIT

Filed June 12, 1963 2 Sheets-Sheet 2

United States Patent Office 3,275,754

Patented Sept. 27, 1966

3,275,754

CALL DISTRIBUTING CIRCUIT

Jesse O. Howell and Donald A. MacLeod, Oakland, Calif., assignors to American Telephone and Telegraph Company, New York, N.Y., a corporation of New York Filed June 12, 1963, Ser. No. 287,320
10 Claims. (Cl. 179—18)

This invention relates to a call distributing circuit and more particularly to a call distributing circuit for use in distributing calls to telephone station lines arranged in groups and served on a group basis by an automatic telephone switching system of the crossbar type.

It is common, of course, in automatic telephone switching practice to serve certain station lines on a group basis. For example, a large department store may be assigned a group of lines having a common telephone number. Calls made to the common number, for example by customers wishing to make price inquiries or to place orders, are then automatically distributed among the lines of the group which are in idle condition at the time the particular call is received at the switching point. In order that each of the order or information clerks may share equally in the work load, an even, equitable distribution of calls among all lines of a group is, of course, important. Many of the call distributing arrangements known and used heretofore have not been entirely satisfactory in this respect since the method of operation has involved scanning each group of lines in a predetermined order, for example from highest to lowest, each time a selection is to made, the first idle line encountered in each scan being selected for the respective call. Obviously, those lines closest to the point at which the scan is started will be selected most often and the clerks or attendants serving the lines will have the heavier work load. In periods of lighter traffic particularly, the more remote lines of a group are apt to be selected relatively infrequently as compared with the higher lines of the group. Further, while certain call distributing arrangements previously proposed have operated satisfactorily in connection with such automatic telephone systems as the step-by-step, these particular arrangements have not been adapted to use with crossbar switching systems. In view of the increasing use of crossbar switching systems throughout the country it is, of course, desirable to provide an efficient call distributing arrangement adaptable to use with crossbar switching systems.

Accordingly, it is an object of our invention to improve the operation of call distributing circuits.

Another object of the invention is the attainment of an equitable distribution of incoming calls among a group of attendants' lines.

A more specific object of the invention is to assure that no station of a group will be called upon to handle a second call until all stations of the group have handled their respective first calls.

A further object of the invention is to facilitate the provision of call distributing facilities in connection with a crossbar switching system.

Yet another specific object of the invention is to delay the resetting of the circuit, after all stations of the group have handled a call, until all station line circuits have returned to normal.

In accordance with a specific embodiment of the invention, each station line of a group is provided with a station line lockup unit which includes a lockup relay and a capacitor connected in series with the operate winding thereof. While the station is in a nonbusy condition the capacitor is charged over the sleeve lead of the station line. When the station line is seized, however, ground from the completing marker replaces the battery and the capacitor is caused to discharge rapidly through the operating winding of the lockup relay, the relay thus being operated. The lockup relay, upon operating, locks through its hold winding to ground at a transistor control circuit which is common to the particular group of station lines. Also, the lockup relay, upon operating, opens the sleeve lead of the station line and connects ground to one terminal thereof whereby to "busy" the line. This artificial busy remains on the line even after the call is completed and the station goes on-hook since the lockup relay remains locked in operated condition. The progressive artificial busying of the station lines, as each is seized, continues until each station of the group has completed the handling of a call thus assuring that no station of the group will be given a second call until all in the group have handled their first call. The circuit is reset after the last available line of the group has been busied.

A feature of the invention is means for progressively applying a busy indication to each station line of a group as the respective line is seized and for retaining the artificial busy condition after the respective station has gone on-hook.

A further feature of the invention is means effective after the last line of the group has been busied and the respective call completed for initiating the resetting of the circuit.

Still another feature of the invention is means whereby unattended stations may be rendered busy to incoming calls.

Another feature of the invention is means for disabling the lockup circuit of a particular station line while an outgoing call is being initiated at the station.

A full understanding of the arrangement contemplated by the present invention as well as an appreciation of the various advantageous features thereof may be gained from consideration of the following detailed description in connection with the accompanying drawing in which.

Figures 1, 3:
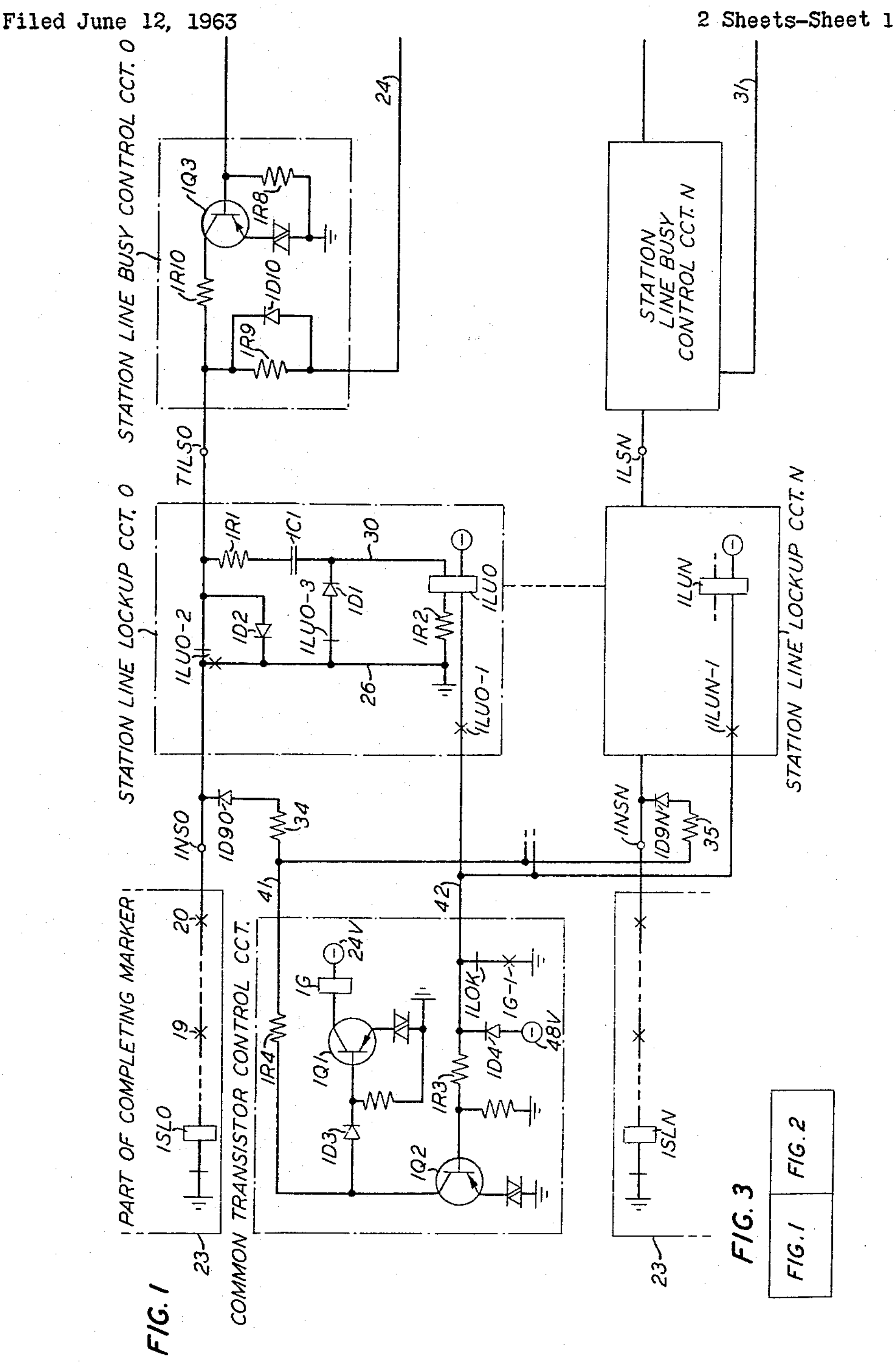
FIG. 1 shows particularly the station lockup circuits and busy control circuits for the first and last lines of a group together with the common transistor control circuit for the group, the lockup and busy control circuits for the first line of the group being shown in detail and those for the last line of the group being indicated by captioned boxes.
FIG. 3 shows the manner in which FIGS. 1 and 2 should be arranged to show one specific illustrative embodiment of the invention.

In order to avoid undue and unnecessary complication of the drawing, only that portion of the crossbar switching equipment which need be directly referred to in the description of the invention has been shown. It will be understood that the over-all switching equipment and circuits will be in accord with the usual arrangement of crossbar systems as disclosed, for example, in United States Patent 2,585,904, issued February 19, 1952 to A. J. Busch.

Figure 2:
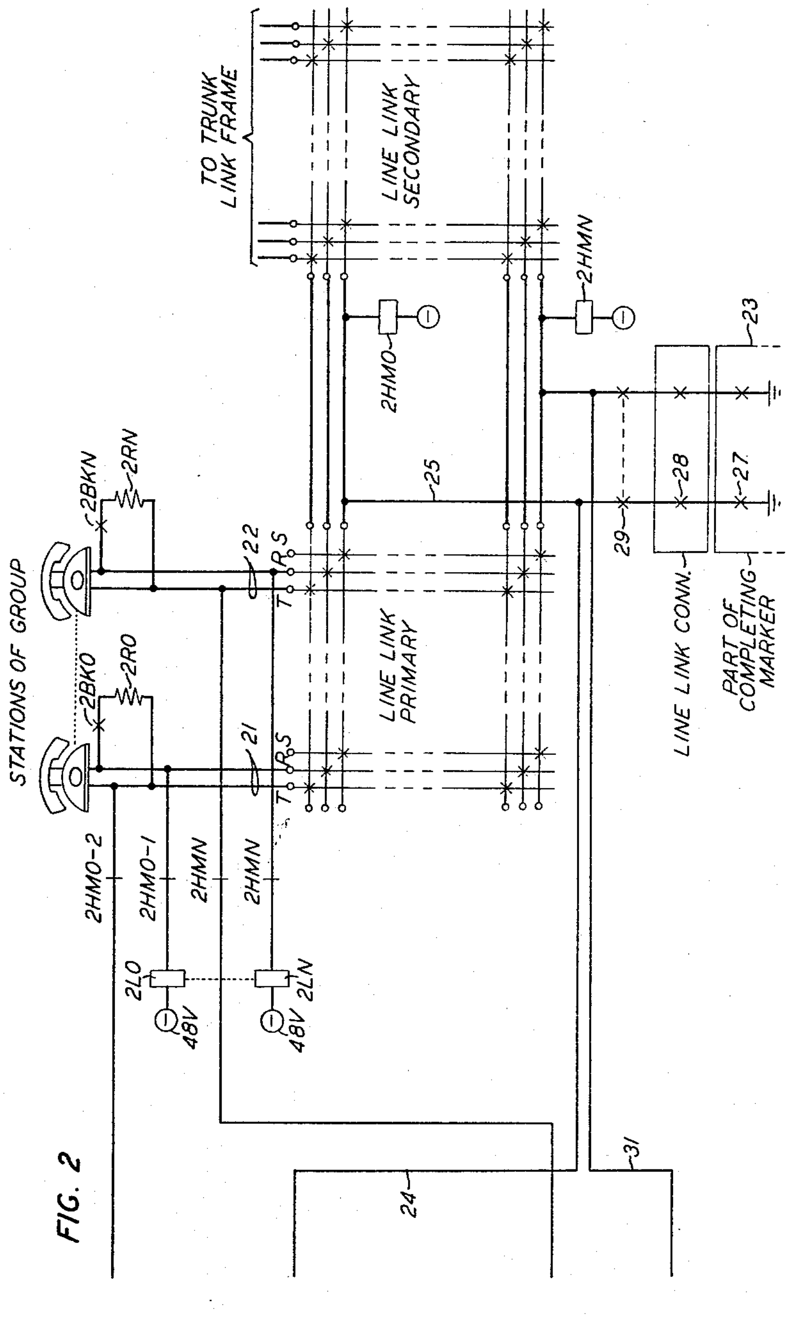
FIG. 2 shows, largely in schematic form, the association of the stations of the two said lines with the line link switch frame of the crossbar office in which the lines terminate.

Referring now to FIGS. 1 and 2 of the drawing, the first station line 21 and the second station line 22 with their respective station sets of a group are shown connected to the primary and secondary switches of the crossbar line link frame of the office. It will be understood that the number of lines included in each group will be as indicated by the requirements of the particular customer. As indicated, the line link connects, in turn, with the trunk link frame. In accordance with standard crossbar system operation, a completing marker "recognizes" an idle line as one having sufficient battery potential on its sleeve lead to operate the sleeve relay of the marker. Assuming, therefore, that an incoming call to the common number assigned to the group in question is received and that the first line 21 of the group is idle, this idle condition will be recognized by the completing marker 23 by the fact that the sleeve lead 24 of the line has sufficient battery potential to operate sleeve relay 1SLO of the marker. This potential is also applied to the capacitor 1C1 which is fully charged at this time, the charging path being from battery at hold magnet 2HMO, lead 25 and sleeve lead 24, resistors 1R9 and 1R1, capacitor 1C1, diode 1D1, break contact 1LUO–3 of lockup relay 1LUO, lead 26 to ground. The operate path of relay 1SLO includes make contacts 19 and 20 of certain other relays of the system which are operated at this point incidental to other functions of the circuits. When the marker thereupon establishes the path between the incoming trunk (trunk link frame) to station line 21, the crosspoints of the primary and secondary switch are closed by applying ground over lead 25 to hold magnet 2HMO, make contacts 27, 28 and 29 being closed through relay operations incidental to completion of the path referred to. The ground just referred to is also applied to sleeve lead 24 of station line 21, through diode 1D10 and resistor 1R1 to capacitor 1C1. Connection of ground to capacitor 1C1 causes it to discharge rapidly through the upper winding of lockup relay 1LUO and through resistor 1R2 to ground; lockup relay 1LUO operates. Relay 1LUO, upon operating, locks up over a path from battery, its lower winding and make contact 1LUO–1, the break contact of key 1LOK, make contact 1G–1 of relay 1G to ground.

Relay 1LUO, operated, opens at the break contact of transfer contact pair 1LUO–2, the sleeve lead 24 between terminals 1NSO and T1LSO and connects ground through the make contact of the same transfer pair to the 1NSO terminal end of the sleeve. This condition, which remains on the line even after the station goes on-hook, prevents line 21 from being again seized so long as lockup relay 1LUO remains operated. Also, relay 1LUO, upon operating, interrupts at its 1LUO–3 break contact the connection between leads 26 and 30 through diode 1D1. This path normally, i.e., when relay 1LUO is in nonoperated condition, bypasses the charging path of capacitor 1C1 around the upper winding of the relay.

When the next incoming call to the group number is received, a line of the group which has sufficient battery potential on the sleeve lead to operate the respective sleeve relay of the completing marker will be selected as before. All lines of the group which have previously been "busied" will, of course, be passed over even though the calls may have been completed and the respective stations are back on-hook. As each additional line is seized, the associated lockup relay is operated and the sleeve lead is opened and grounded. This progressive artificial busying of the lines of the group will continue until the last available line of the group, for example line 22 with sleeve lead 31 and lockup relay 1LUN, has been seized and busied. It will be understood that each lockup relay, upon operating, will lock to ground at the common transistor control circuit as described above in the instance of relay 1LUO. For example, relay 1LUN, upon operating, will lock to the common ground through a path completed at its contact ILUN1.

After the last line of the group has been busied, the common transistor control circuit operates to restore all lines to normal for start of the next cycle. It will be observed that sleeve 24 of line 21 and sleeve 31 of line 22 are both connected at the 1NSO and 1NSN terminal ends, respectively, to common lead 41 of the common transistor control circuit, diode 1D90 and resistor 34 being included in the connecting path of sleeve 24 and diode 1D9N and resistor 35 being included in the connecting path of sleeve 31. It will be understood that the sleeve leads of the intervening lines are similarly connected.

So long as a single line of the group remains idle, battery will be supplied to common lead 41 from the respective sleeve. This battery is applied through resistor 1R4 and Zener diode 1D3 to the base of transistor 1Q1 whereby to hold the transistor in conductive condition. Under this condition, relay 1G is held operated over a path from ground, emitter-collector circuit of the 1Q1 transistor, winding of relay 1G to battery. So long as a single line of the group remains idle, therefore, ground is connected to lead 42 through make contact 1G–1 of relay 1G and locking paths are maintained for all operated lockup relays as 1LUO and 1LUN.

Let us assume now, however, that all lines of the group have been busied and the sleeve leads interrupted and grounded by operation of the respective lockup relays. Under this condition none of the sleeve leads will supply to lead 41 the potential required at diode 1D3 to hold transistor 1Q1 in conducting condition. Transistor 1Q1 goes to OFF condition, therefore, relay 1G releases and ground is removed from lead 42 at make contact 1G–1 thereby interrupting the previous locking path for operated lockup relays whereby to release the relays.

It is desirable, of course, that complete restoration of the circuit to normal and the start of the next cycle of operations be delayed until all lockup relays have fully released and this desirable objective is attained by the arrangement disclosed. Assuming that one lockup relay is delayed in its release, and assuming further for purposes of description that relay 1LUO is the relay in point, battery will be supplied through make contact 1LUO–1 to lead 42 and, now that ground has been removed at make contact 1G–1 of relay 1G, this battery will be applied through resistor 1R3 to the base of transistor 1Q2. This turns transistor 1Q2 ON, rendering it conductive, and ground is supplied through the emitter-collector path to lead 41. This establishes a shunting path with regard to the connection to the base of transistor 1Q1 and avoids the application of an activating potential thereto. However, when lockup relay 1LUO (and all other lockup relays) has fully released, battery is removed from the base of transistor 1Q2, turning it to OFF condition, and the shunting ground is removed from lead 41. Transistor 1Q1 will now be rendered conductive, assuming that one or more of the lines of the group are idle, relay 1G will operate, and locking ground will again be connected through make contact 1G–1 to lead 42 thereby providing locking paths for the lockup relays as they operate.

Diode 1D4 and the battery path controlled thereby protect contact 1G–1 of the 1G relay and the 1LOK key contacts from the "kick" of the lockup relays releasing.

When an outgoing call is initiated at one of the stations of the group, it is desirable, of course, that the lockup circuit be inactivated so that it will not be operated by circuit closures incidental to the outgoing call. Let us assume, by way of example, that the station associated with line 21 goes off-hook to initiate an outgoing call. Closing of the substation loop operates line relay 2LO over a path from battery, winding of relay 2LO, break contact 2HMO–1 of hold magnet 2HMO, closed substation loop, break contact 2HMO–2 of the hold magnet, resistor 1R8 to ground. In accord with the normal crossbar operation, operation of line relay 2LO causes a dial tone marker to set up a path from the line appearance to an originating register. Closure of the substation loop also causes battery from the winding of line relay 2LO to be applied to the base of transistor 1Q3 thereby turning the transistor ON and rendering it conductive. Ground is now applied through the emitter-collector circuit of transistor 1Q3 and through resistors 1R10 and 1R1 to capacitor 1C1. This ground potential applied through the two resistors causes capacitor 1C1 to discharge but at a rate which does not operate the lockup relay 1LUO. The capacitor is discharged to a point, however, where the lockup relay 1LUO will not be operated when, in accord with the normal crossbar operation, the dial tone marker closes ground to sleeve 24 through make contact 28. Diode 1D2 returns to ground the high positive pulse applied by the dial tone marker under heavy traffic conditions to the line hold magnet.

If a station is to be temporarily unattended, it may be caused to test busy by means provided in accordance with one feature of the invention. For example, if the station associated with line 21 is to be left unattended, switch 2BKO may be closed thereby connecting resistor 2RO (of relatively high resistance, for example of the order of 10,000 ohms) across the tip and ring of the line. Current flow from line relay 2LO through the closed resistor loop at the station causes transistor 1Q3 to conduct and capacitor 1C1 is discharged as in the instance of initiation of an outgoing call as described above. Here again, the rate of discharge is not sufficient to operate the lockup relay 1LUO. The potential remaining in capacitor 1C1 is such that the respective sleeve relays of the completing marker will not operate and the particular line is not recognized by the completing marker as "idle" when a call is to be extended to the group. The current flow through the path including resistor 2RO is insufficient to operate line relay 2LO.

It will be apparent from the above description that the novel arrangement provided permits application of the call distributing facilities to a standard crossbar system without any major modification in the arrangement or operation of the over-all system. For example, the novel station line lockup circuits utilize battery and ground conditions normally prevailing respectively under idle and seizure conditions for charging the lockup relay capacitor under idle line conditions and for rapidly discharging it when the line is seized whereby to operate the lockup relay. Further, because of the novel arrangement of the station line lockup circuits and the station line busy control circuits, the various desirable features are attained without addition to the normal number of line conductors between the central office and the respective stations. The only modification required at the stations themselves is the provision of the high resistance shunting path and switch for closing the path whereby to "busy out" the station on occasion. Obviously, the fact that substantially no changes in the over-all crossbar system need be made incidental to provision of the call distributing facilities greatly increases the commercial feasibility and desirability of the call distributing arrangement.

While in the above specific illustrative embodiment of the invention the station lines described are telephone station lines, it will be understood that the call distributing circuit contemplated may also be used in connection with teletypewriter station lines.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a plurality of lines arranged in a group, cross-point switching means for effecting connections to said lines, marker means for controlling said switching means, artificial busy circuit means for each of said lines, said last-mentioned means including a relay having a primary and a secondary winding, a capacitor, means for normally charging said capacitor excluding said relay windings, means responsive to establishment of a connection through said switching means by said marker means to a line for discharging said capacitor through said primary winding, locking means responsive to energization of said relay for locking said relay operated, means for discharging said capacitor on origination of a call by the line at a rate such as to prevent operation of said relay and to a value insufficient to energize said relay on direct application of ground to said capacitor, and means for releasing all of said locking means on energization of all said relays of said lines in said group.

2. In a telephone system, the combination defined by claim 1 further characterized in means effective upon operation of said relay for interrupting the continuity of the associated line and for connecting ground to one section thereof.

3. In a telephone system, the combination defined by claim 1 further characterized in that said means for discharging said capacitor on origination of a call includes a transistor circuit.

4. In a telephone system, the combination defined by claim 3 further characterized in means effective upon closing the station loop of the line originating a call to activate said transistor circuit.

5. In a telephone system, a plurality of lines arranged in a group, cross-bar switching means for effecting connections to said lines, marker means for controlling said switching means, artificial busy circuit means for each of said lines, said last-mentioned means including a relay having a primary and a secondary winding, a capacitor, means for normally charging said capacitor excluding said relay windings, means responsive to establishment of a connection through said switching means by said marker means to a line for applying ground through a relatively low resistance path to said capacitor whereby to discharge said capacitor through said primary winding of said relay and operate said relay, locking means responsive to operation of said relay and including said secondary winding for holding said relay operated, means effective upon origination of a call by a line for applying ground to said capacitor through a relatively high resistance path whereby to discharge said capacitor through said primary winding of said relay at a rate such as to prevent operation of said relay and to a value insufficient to operate said relay when ground is subsequently applied to said capacitor through said relatively low resistance path, and means for releasing all of said locking means on operation of all said relays of said lines in said group.

6. In a telephone system, the combination defined by claim 5 further characterized in means effective upon operation of said relay for interrupting the continuity of the associated line and for connecting ground to one section thereof.

7. In a telephone system, the combination defined by claim 5 further characterized in that said means for applying ground to said capacitor through a relatively high resistance path includes a transistor and means effective upon closure of the station loop associated with the line originating the call for activating said transistor.

8. In a telephone system, a plurality of station lines arranged in a group; a station set connected to each of said lines; cross-point switching means for effecting connections to said lines; marker means for controlling said switching means; artificial busy circuit means for each of said lines, said last-mentioned means including a first relay having a primary and a secondary winding, a capacitor, means for normally charging said capacitor excluding said relay windings, means responsive to establishment of a connection through said switching means by said marker to a line for applying ground through a first path of relatively low resistance to said capacitor whereby to discharge said capacitor through said primary winding of said first relay and operate said relay, locking means including said secondary winding and responsive to operation of said first relay for holding said first relay operated, means effective upon origination of a call by a station set for applying ground to said capacitor through a second path of relatively high resistance whereby to discharge said capacitor through said primary winding of said first relay at a rate such as to prevent operation of said first relay and to a value insufficient to operate said first relay when ground is subsequently applied to said capacitor through said first path of relatively low resistance, a shunt path of relatively high resistance at said station set, and means effective upon closure of said shunt path for discharging said capacitor to a value below the operate value of said second relay.

9. In a telephone system, the combination defined by claim 8 further characterized in that said means effective upon origination of a call by a station set and said means effective upon closure of said shunt path each include a common transistor circuit and means effective both by closure of the normal station loop and by closure of said shunt path for activating said common transistor circuit.

10. In a telephone system, the combination defined by claim 9 further characterized in means effective upon operation of said first relay for interrupting the continuity of the associated station line and for connecting ground to one section thereof.

References Cited by the Examiner

UNITED STATES PATENTS

| | | | |
|---|---|---|---|
| 2,059,506 | 11/1936 | Meszar | 179—27 |
| 2,709,718 | 5/1955 | Pharis | 179—18 |
| 3,142,728 | 7/1964 | MacLeod | 179—18 |

KATHLEEN H. CLAFFY, *Primary Examiner.*

W. C. COOPER, *Assistant Examiner.*